INVENTOR
RAYMOND J. GRAF &
ROBERT BURNS &
ROBERT H. JAHNKE,
BY Yungblut, Melville, Strasser and Foster
ATTORNEYS

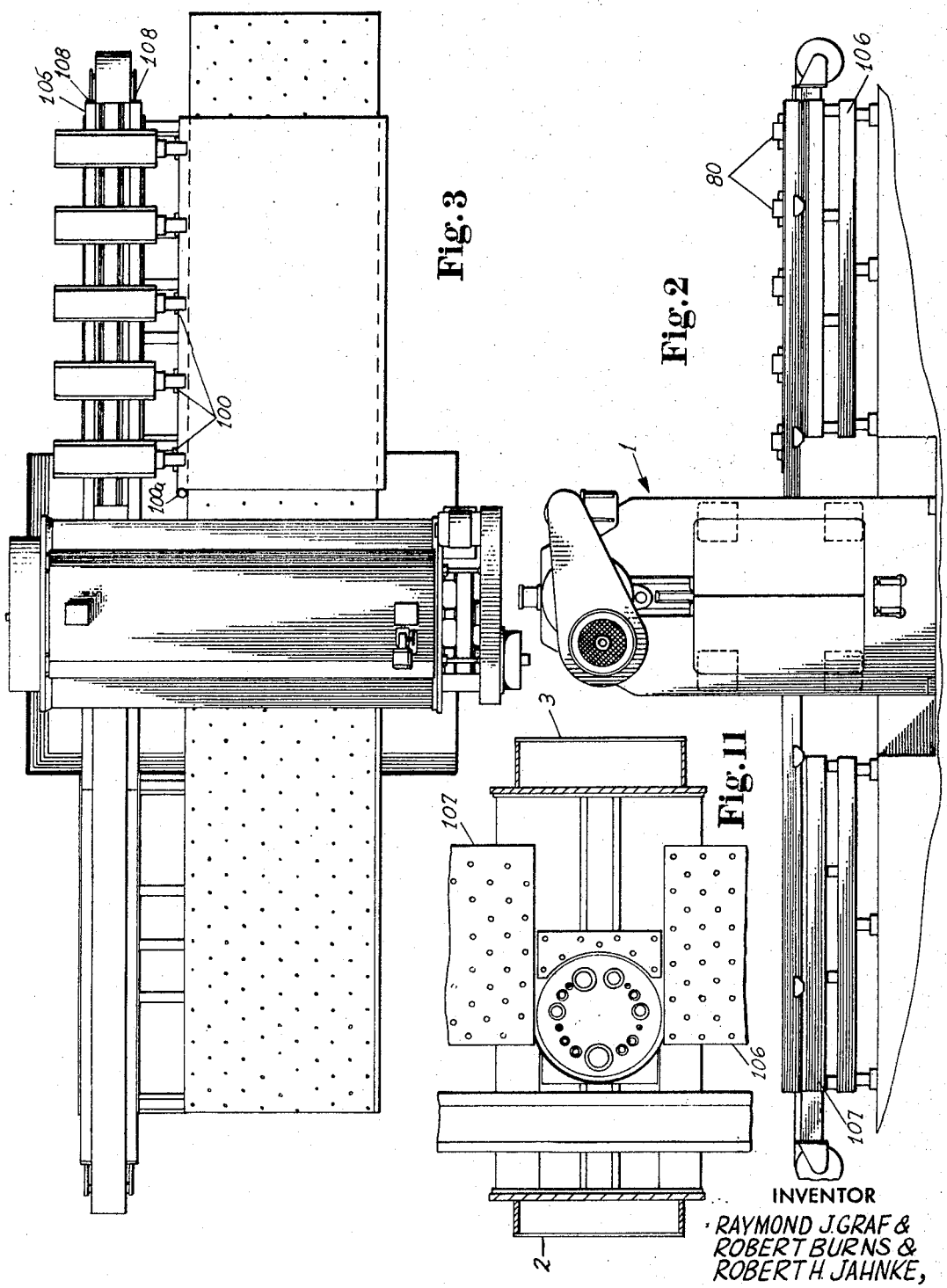

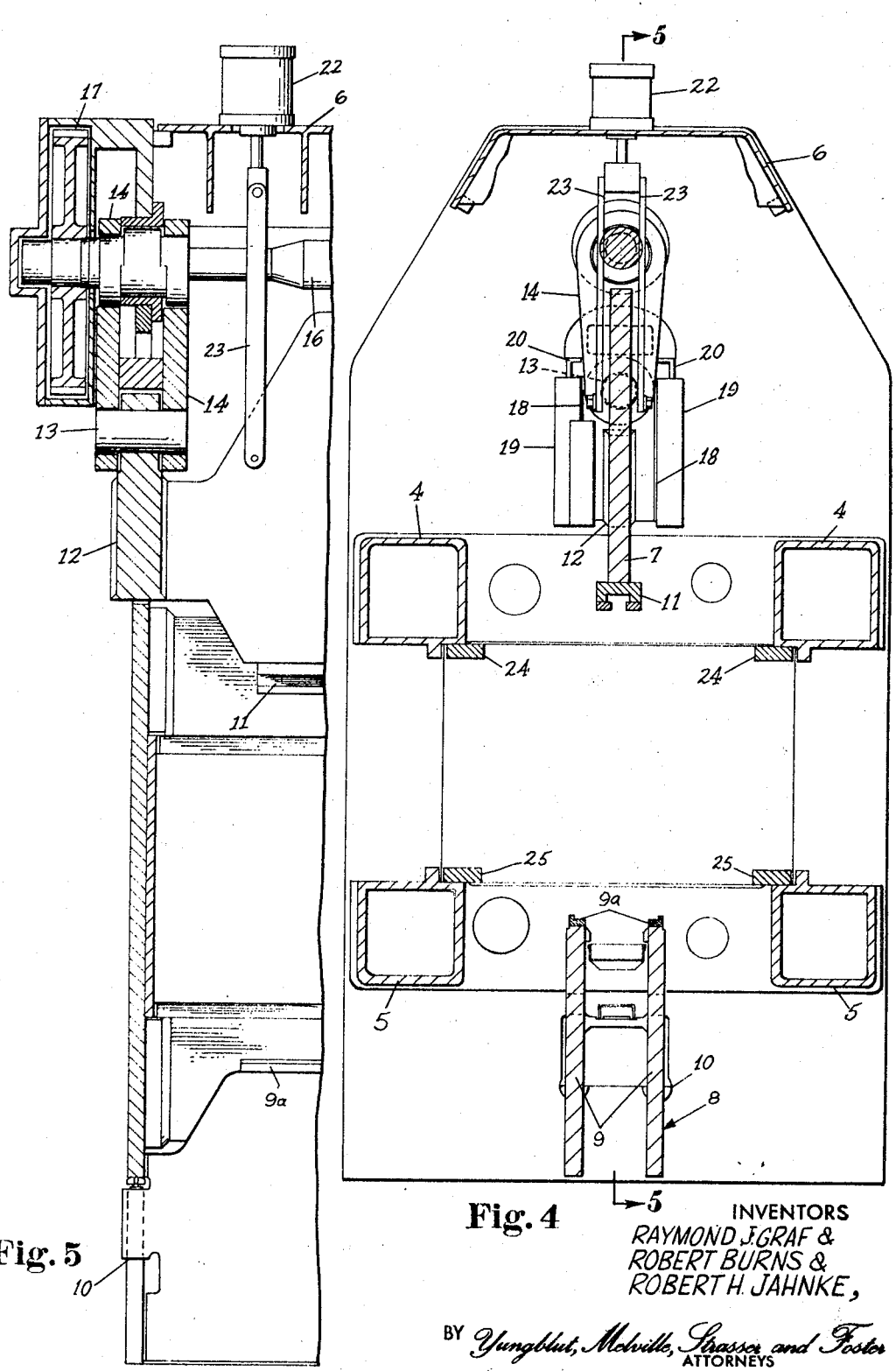

INVENTORS
RAYMOND J. GRAF &
ROBERT BURNS &
ROBERT H. JAHNKE,
BY Yungblut, Melville, Strasser and Foster
ATTORNEYS

INVENTORS
RAYMOND J. GRAF &
ROBERT BURNS &
ROBERT H. JAHNKE,

BY Yungblut, Melville, Strasser and Foster
ATTORNEYS

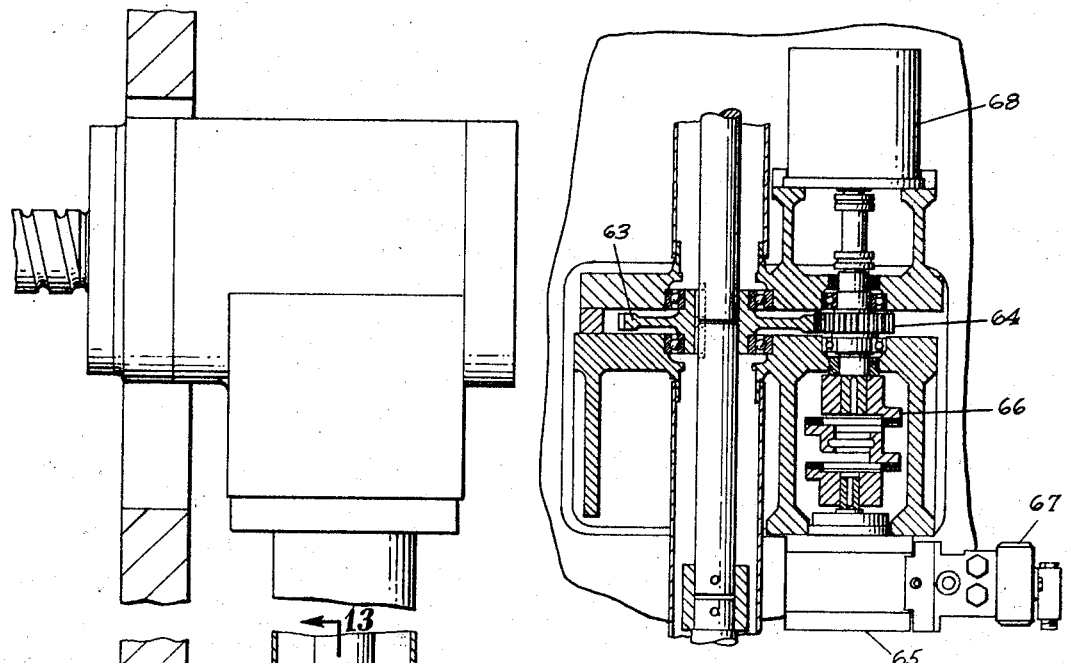
Fig. 13
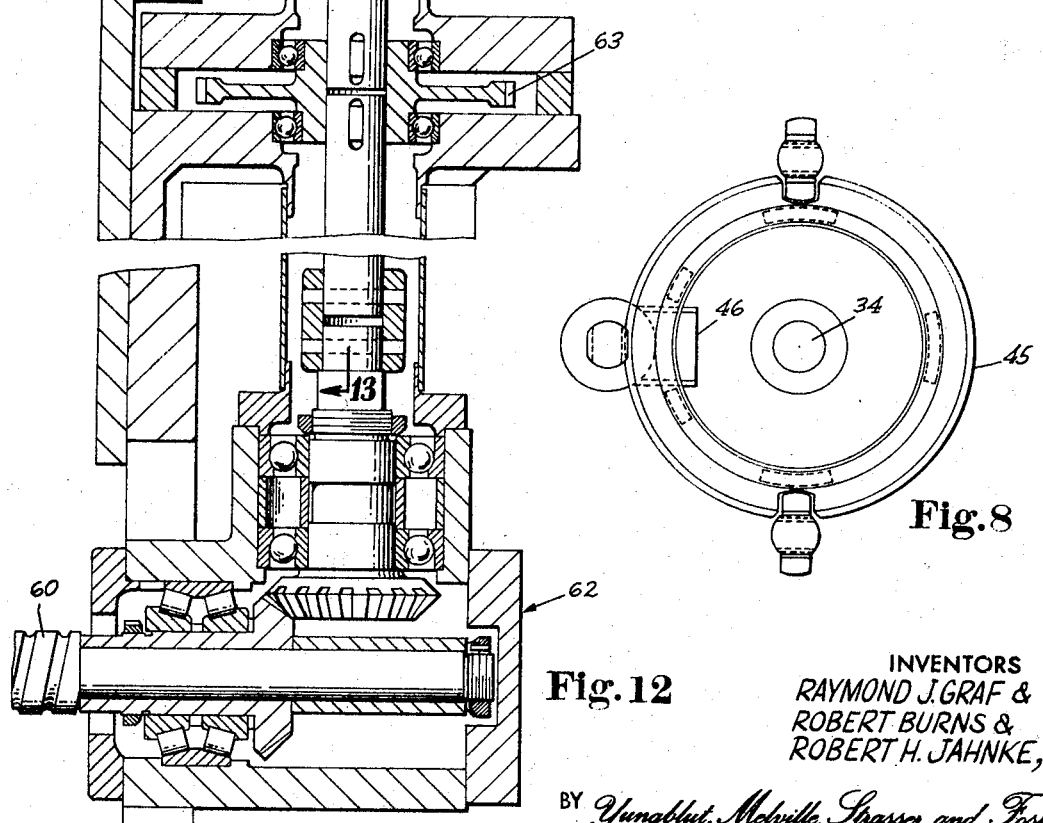
Fig. 12
Fig. 8
INVENTORS
RAYMOND J. GRAF &
ROBERT BURNS &
ROBERT H. JAHNKE,
BY *Yungblut, Melville, Strasser and Foster*
ATTORNEYS

INVENTORS
RAYMOND J. GRAF &
ROBERT BURNS &
ROBERT H. JAHNKE,

BY Yungblut, Melville, Strasser and Foster
ATTORNEYS

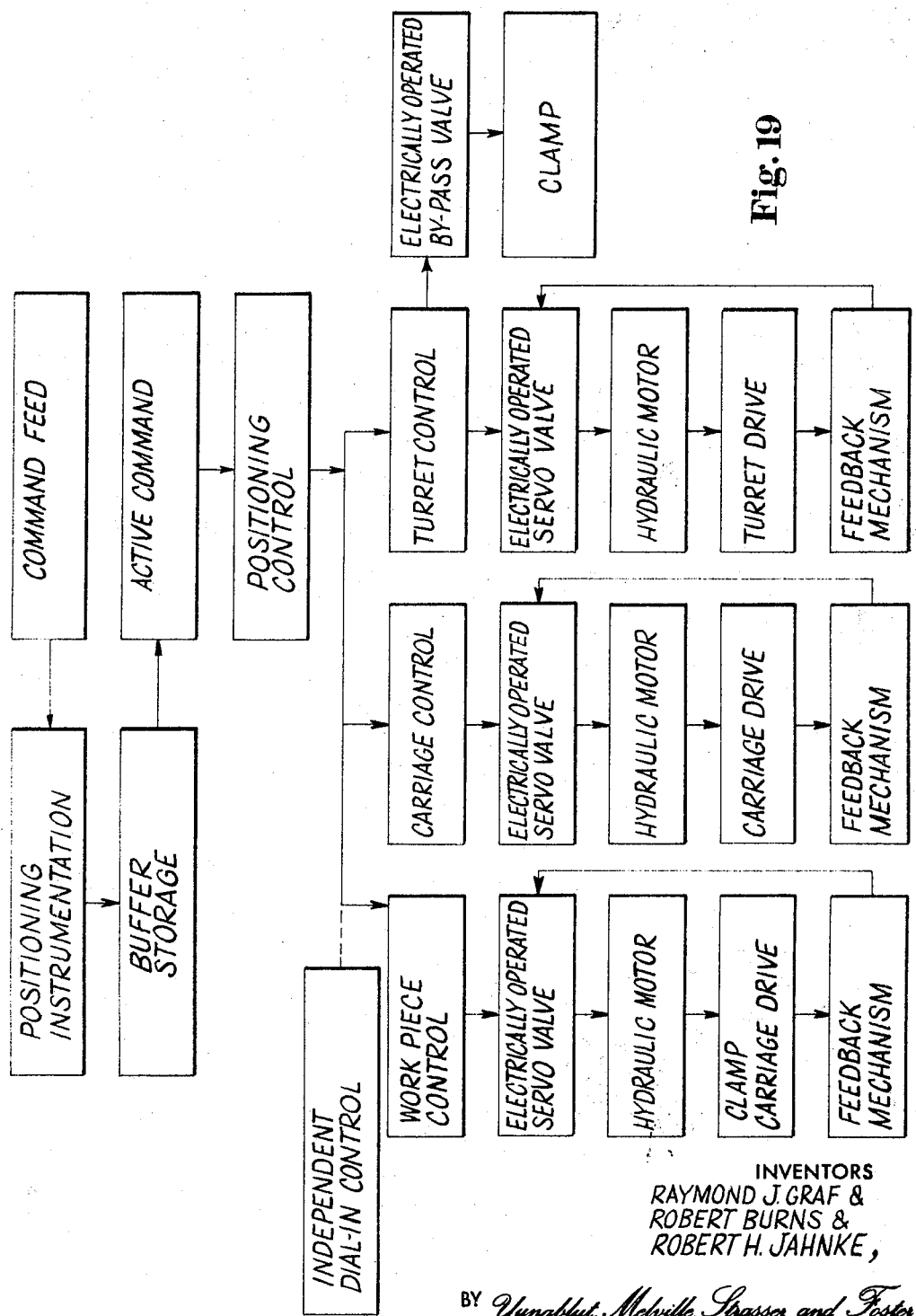

United States Patent Office

3,448,645
Patented June 10, 1969

3,448,645
NUMERICALLY CONTROLLED PUNCHING MACHINE AND METHOD
Raymond J. Graf, Cincinnati, Robert Burns, Fairfield, and Robert H. Jahnke, Cincinnati, Ohio, assignors to The Cincinnati Shaper Company, Cincinnati, Ohio, a corporation of Ohio
Filed Aug. 11, 1966, Ser. No. 571,888
Int. Cl. B26d 5/30, 5/12
U.S. Cl. 83—71                             18 Claims

ABSTRACT OF THE DISCLOSURE

A numerically controlled and programmed punching machine for use on the entire surface of sheet or strip material moving in only a single direction. This is accomplished by a unique arrangement of parts including opposing movable carriages containing reversible rotatable turrets. By providing for two punching stations, it is possible to operate up to and beyond the edge of the material with a minimum of movement of the said parts.

This invention relates to a numerically controlled and programmed punching machine and method of the type generally applied to metallic sheet, strip, plate and the like. While it is not intended to be so limiting, the description hereinafter will for convenience, be presented in conjunction with the punching of metallic sheet material.

Maintenance of a smooth production flow, time delays and the ability to duplicate work have been problems typical of machine shops. Heretofore, the metallic sheet to be punched, generally limited to relatively small sheets, had to be adjusted, shifted in at least two directions, readjusted, etc., until the punching operation was complete. The multidirection adjustment of the workpiece limited the punching operation to sheets, thereby excluding a continuous coil of strip. Further adjustments, all time consuming, were required in the tool and its support to properly align the particular operation. And, the necessary result flowing from the numerous adjustments, was the nonduplication of parts.

With these problems in mind, it is a primary object of this invention to provide a numerically controlled and programmed punching apparatus which automatically adjusts the workpiece, operates thereon, and duplicates the programmed operations on succeeding workpieces.

It is a further object of this invention to provide punching apparatus of the character described whereby the apparatus is operated to move the workpiece in only a single direction.

Another object of the instant invention is the provision of a method for the continuous and cyclic punching of a workpiece whereby the entire surface may be subject to punching while movement of the workpiece is confined to a single direction.

A further object of this invention is to provide automatic punching apparatus capable of receiving the workpiece feed from a continuous coil of strip material. Another object being a method by which a continuous coil of strip may be punched without the necessity of any lateral movement thereof.

An additional object of this invention is to provide punching apparatus of the character described whereby relative movements of the punching station are transverse to the movement of the workpiece providing punching positions aligned and perpendicular to the movement of said workpiece.

A further object of the instant invention is the provision of a plurality of adjustable clamps securing the workpiece whereby the selective movement of each will expose a given surface area of the workpiece to punching thereby permitting operation thereon up to and including the edge. Another object being a novel double action reciprocating clamp for securing sheet-like material and operative by the application of a single force.

A further object is the provision of a rotatable turret containing a plurality of spaced apart punches and two diametrically opposed punching stations such that only one station coincides with one of the punches at an given time. A further object of the instant structure being the dual safety feature by means of which premature movement of the punches are prevented.

These and other objects will become apparent from the following detailed description to those skilled in the art when considered in light of the accompanying drawings, wherein:

FIGURE 2 is a front elevation of the punching machine assembly whereby the material to be punched passes from right to left.

FIGURE 3 is a top view of the assembly illustrated in FIGURE 2.

FIGURE 4 is a cross-sectional view taken on the line 4—4 of FIGURE 1 with the carriages and turrets removed.

FIGURE 5 is a fragmentary cross-sectional view taken on line 5—5 of FIGURE 4.

FIGURE 8 is a full view taken on line 8—8 of FIGURE 7 showing the underside of the punch holding turret carriage.

FIGURE 11 is a plan view of one of the turrets showing a typical arrangement of punches or dies, and the diametrically opposed punching stations.

FIGURE 12 is a side cross-sectional view of the drive mechanism for the carriage.

FIGURE 13 is a front cross-sectional view of the drive mechanism shown in FIGURE 12.

FIGURE 19 is a flow chart illustrating the means by which the punching machine is made operative.

Figures 1, 18:
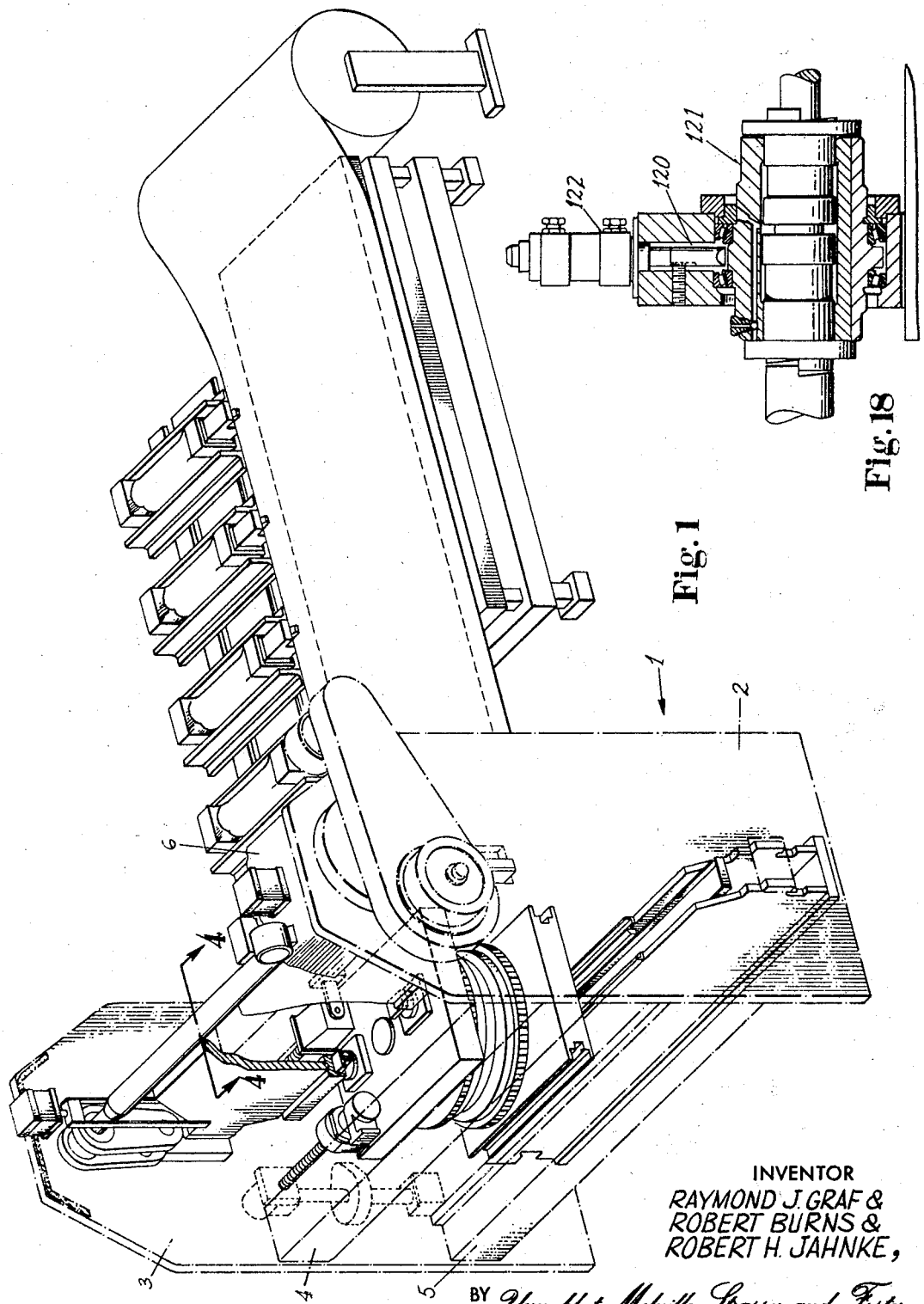
FIGURE 1 is a general perspective view of the machine with parts in section as viewed from the exit side of the punching machine assembly.
FIGURE 18 is a cross-sectional view of the carriage drive housing showing the means for making one carriage inoperative.

Briefly, in the practice of the invention, there is provided a punching frame having a base and a head each with a carriage thereon and mounted for single direction movement transverse to the movement of the workpiece. On each of said carriages is a reversible rotational turret. A series of punching tools are received in the upper turret and aligned with a corresponding die located in the lower turret. Movement of the carriages are minimized by the presence of two punching stations, one of which is always idle. They are 180° apart and are located on the pitch line of the punches and dies.

The punching frame is further provided with loading and exit tables at opposite sides of said frame, the tops of which define a pass line extending between the rotatably mounted turrets. The workpiece in the form of sheet, strip, plate or the like, is loaded onto the loading table and directed toward a series of adjustable work clamps, rigidly attached to a movable carriage adjacent one side of said loading table, until resistance is encountered—this establishes one element of a two directional reference point. The movement of the workpiece towards the frame contacting a retractable stop determines the last element necessary to locate the workpiece relative to a zero-zero position. This serves as a reference point for subsequent programmed directions to the punching machine. When the workpiece is so positioned that it is property referenced at zero-zero, the machine is ready for automatic operation.

The program is started by energizing the plurality of workpiece clamps which close on the workpiece at one edge thereof. With the workpiece securely clamped, the carriage to which the clamps are attached, moves towards the punching frame a distance commanded by the numerical control. Simultaneously therewith, the upper and lower carriages move in a direction perpendicular to the direction of the clamped workpiece until one of the punching stations is located over the predetermined point where the punching operation is to be made. Again, simultaneous with the movement of the workpiece and the turret carriages, the turrets rotate in accordance with the commands given locating the proper punch and die at the preselected punching station. Once the hole is punched, the machine is ready for a new command. It is readily apparent that a series of aligned holes can be punched by the selective movement of either the carriage or the workpiece.

When it is necessary on occasion to program a hole in the proximity of the work clamps, the provision of the adjustable clamps overcome this heretofore impossible task. According to the command of the machine, the clamp in danger of interference with the carriage and turret automatically unclamps and retracts to a safe position far enough from the punch that it is not contacted and the punch is then free to make a hole directly under the clamp location or in that proximity. Upon clearance, by movement of the workpiece or carriages, the clamp will automatically return to its previously clamped position. During this adjustment, the remaining clamps securely hold the workpiece in position.

After the last punching operation, the clamps continue to move the workpiece to the unloading position on the exit table. In the meantime new material may be brought onto the loading table to begin its positioning with reference to the zero-zero point. The cycle may again be duplicated in accordance with the programmed command.

Referring now in more detail to the drawings, attention is first directed to FIGURES 1–3 inclusive. The general construction of the machine shown generally at 1, is such as to introduce straight side press rigidity to the punching of sheet-like materials where formerly gap-type machinery was used. In its simplest form, the punching machine of the instant invention comprises two vertical support housings 2 and 3 connected by upper and lower box shaped rail members 4 and 5 respectively, to define an opening therebetween, and an upper brace member 6. Each of said box shaped members or cross rails run the full length between the vertical housings 2 and 3 where they are welded or securely bolted to plates connected to the respective housings. This provides extreme rigidity in both directions and offers an accurate mounting for the punch support equipment. This bridge type construction avoids the limitations of the more common gap-type or C-configured machinery. One major fault surrounding gap-type machinery becomes increasingly evident as the gap is extended to accommodate wide sheets. It is not unusual with the prior art machines to operate on only half a sheet, then turn it to complete the task. This results in double handling and does not eliminate the excessive deflections that frequently are found in gap-type machinery. Excessive deflections can cause extra punch wear and possible breakage due to these deflections.

Figure 6:
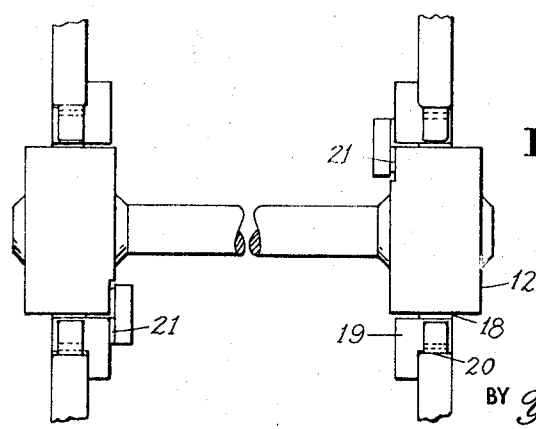
FIGURE 6 is a top view of the ram showing in part the relationship of the ram to the housing frame.

FIGURE 4 is a section view of the machine taken along line 4—4 of FIGURE 1 showing the forward housing member. FIGURES 5 and 6 illustrate some of the same elements found in FIGURE 4 but at different angles, thus supplementing the description hereinafter given. This machine utilizes a ram 7 and bed 8 such as found in press brakes. The bed 8 consists of two plates 9 running the full length of the machine and welded together by cross members. These spaced plates 9 centrally locate the die part of the punch set and further provide a convenient means for channelling the slugs to a conveying mechanism that carries the slugs to a scrap bin. The top surface of vertical members 9 may be provided with reaction rails 9a for rapid replacement when and if necessary. To dissipate the stress caused by the punching operation, the bed is interlocked with the end housings 2 and 3 with the aid of bed shoes 10. This construction transmits the load from the bed to the housing and distributes the load more uniformly and over a larger area. Similar methods are employed on press brakes.

The ram 7 is a single plate member similar to those found in press brakes and is the vertically reciprocating member that actuates the punches. The working edge of ram 7 carries a key slotted actuator rail 11, the function of which will be discussed later in conjunction with the description of the upper turret. At the sides of ram 7 are ram yokes 12 welded integrally with the ram and extending upwardly to provide connection by means of pin 13 through connecting link 14. Connecting link 14 is a double plate member made symmetrical about the housing 2 and 3 to provide center line loading and thus eliminating and bending load on the housings which would cause weaving. The connecting links are driven through two eccentrics 15 on the drive shaft. The drive shaft 16 is rotated by main gear 17 and then by a conventional drive mechanism and a conventional air clutch and brake mechanism. In brief, the press drive comprises a single reduction, single drive gear arrangement. Ram yoke 12 also extends to meet the guides 19 which are secured to housings 2 and 3. A bearing surface 18 of suitable materials such as bronze, is fixed to the ram yoke and mates with the guides 19. Guides 19 are accurately adjustable by means of tapered gibs 20 giving good front-to-rear alignment. The ram yokes also extend to receive liner 21 which provides end-to-end alignment of the ram. This is shown in detail in FIGURE 6. As a means to nullify the weight factor of the ram and permit a fast action drive for the machine, there are provided counterbalanced cylinders 22 on the upper housing brace 6 connected through linkage 23 to the ram.

Further, mounted at the internal corners of the two upper and two lower cross rails 4 and 5 are guide rails 24 and 25 respectively. They may be secured such as by set screws to facilitate easy adjustment. These guide rails run the full length of the cross rails to give complete transverse movement to the upper and lower assemblies, each of which comprise a carriage and turret.

Figure 9:
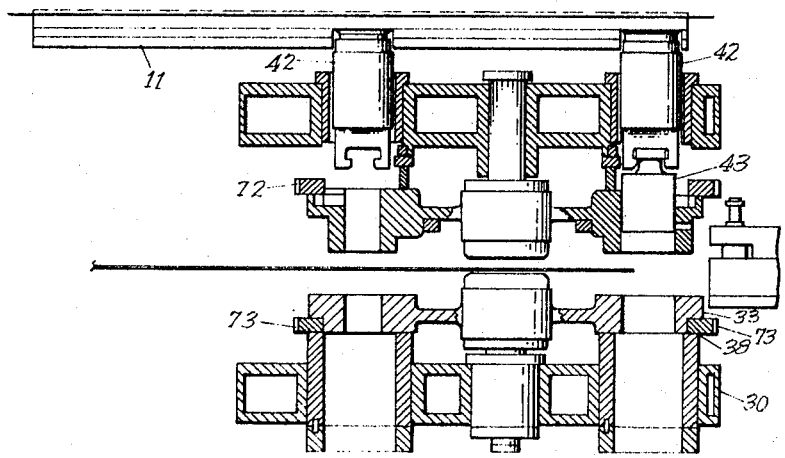
FIGURE 9 is a cross-sectional view similar to FIGURE 7 and perpendicular to but including details on the relationship of punch actuators to punches.
Figure 7:
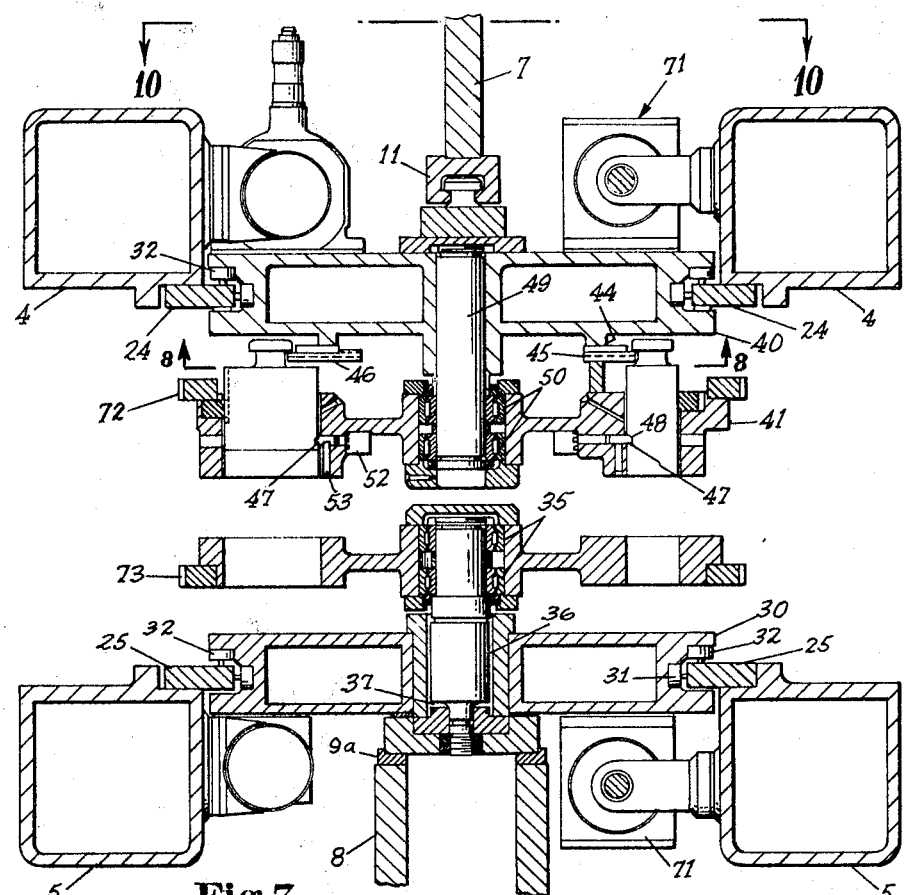
FIGURE 7 is a cross-sectional view similar to FIGURE 4 taken on the line 4—4 of FIGURE 1 but including the carriages and turrets.

Turning now to FIGURE 7, the relationship of the upper and lower assemblies to the guide rails 24 and 25 become apparent. While some similarity exists between the upper and lower assemblies, for convenience each will be described separately for their respective details. The lower assembly consists of a carriage 30, essentially of welded box construction, having an indent 31 along its transverse edges to engage guide rails 25. To facilitate the transverse movement of the carriage along the guide rails, there are provided antifriction way bearings 32 that react against guide 25. Bearings suitable for the construction of this machine are recirculating roller bearings which provide essentially zero clearance and have a very low coefficient of friction. As will be apparent hereinafter, the principal function of the lower carriage is to carry the lower turret 33, the second major element of the lower assembly, along an axis transverse to the movement of the workpiece to a predetermined location commanded by the control. While the lower carriage carrying the lower turret provides the necessary guiding so that it moves in a true transverse path, it is not required to take the punching load. It simply carries the weight of the turret. The turret 33 is trunnion-mounted to the carriage 30 in such a manner as to be rotatable around axis 34, see FIGURE 8, recognizing that axis 34 is common to the upper and lower turrets and moves back and forth along the transverse path of the upper and lower assemblies. Turret 33 rotates on bearings 35 which are held by pin 36. Pin 36 actually acts as a piston for hydraulic oil 37 which holds the entire lower turret 33 up to provide clearance at point 38 when the turret is rotating. Attention is directed to FIGURE 9 wherein the turret is in a punching position with contact at point 38. Whenever a die carried in turret 33 arrives at a desired location, the pressure at 37 is dropped and the turret lowers to make contact at point 38. The lower assembly, i.e., turret and carriage, are such that during the punching operation, the load is transmitted directly from the punching die through the turret and through the carriage directly to the bed without causing any bending moment in the turret or carriage.

Figure 10:
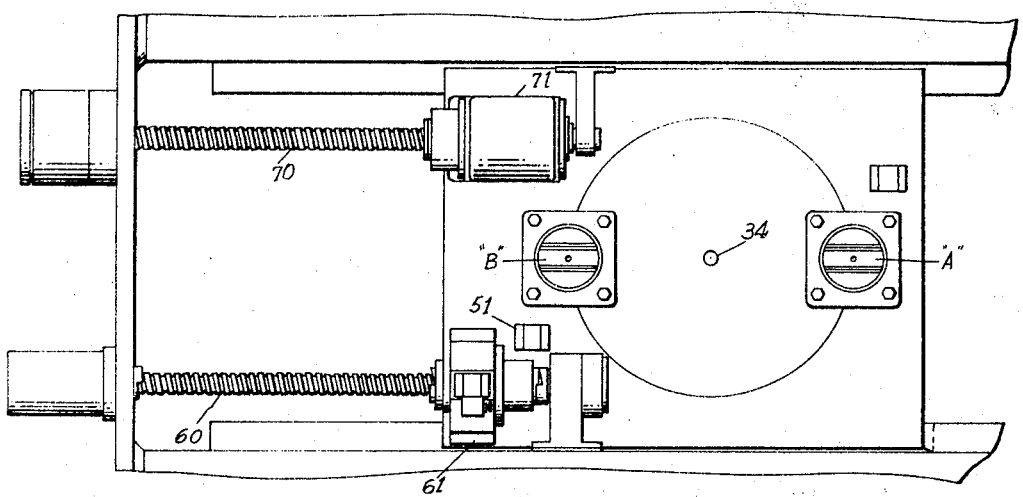
FIGURE 10 is a top view taken on line 10—10 of FIGURE 7 with parts removed to show the drive assemblies for the turrets and carriages.

The upper assembly contains carriage 40 and turret 41. Carriage 40 is carried on rails 24 through linear motion roller bearings 32 and serves to carry the turret 41 to its proper location. It further carries punching actuators 42. There are two of these punching actuators and they ride in the key slot on rail 11, attached to the lower edge of ram 7, always maintaining the spacing equal to the pitch diameter of turret 41 and always remain on the transverse axis. This then defines punching station A and punching station B as shown in FIGURE 10 and it is obvious that both punching actuators move as the ram 7 moves. The lower end of each punching actuator contains a T slot and is shaped so as to progressively allow the mating T on the top of each punch holder to engage it. A typical punch holder is represented as 43. It should be understood that there are a plurality of these punch holders of various sizes contained within turret 41. While it is not intended to be a limitation on the construction of the machine made in accordance with the description given, FIGURE 11 shows a typical arrangement of fifteen punch or die holders of various sizes and the relative arrangement of such. While the number of punch holders and corresponding dies will vary, it is important that no two punch holders be diametrically opposed to one another, in other words, any two must be less than 180° apart.

There are two safety features which prevent a premature dropping of a punch holder. Attached to the under side of turret 40 is an annular rib 44, attached to this is an angular ring 45 shown in FIGURES 7 and 8 which prevents a punch holder from dropping below the position shown except when it is in either location A or B. When a punch holder is aligned with one of the two slots in ring 45, it will be engaged with punch actuator 42 at either location A or location B, but not both, there being no possibility of a punch present at the opposite location. Ring 45 is further provided with a sliding section 46 which is used to remove punch holders from the turret during maintenance operations. A second feature preventing premature movement of the tool holder is the hydraulic detent 47 typically shown in FIGURE 7. This detent holds the tool holder high enough so that it does not normally ride on ring 45 as this would otherwise cause wear. The punch and punch holder that has been selected for work in any given cycle will be depressed downwardly by actuator 42 and overcome the hydraulic force holding detent 47 by a camming action on the wedge-like surface 48. The punch holder will be returned by the gripper motion in T slot on the bottom of 42 on the return stroke of ram 7. Detent 47 is held against the punch holder by hydraulic oil sent through an annular distributor 52 and provides the unique means of releasing the detent when it is necessary to change punch holders. If a punch holder is left out of the turret for any reason, the detent cannot escape its hole because set screw 53 is engaged with a slot in the detent and prevents its travel beyond a certain limit. Upper turret 41 rotates about pin 49 on bearings 50. While both carriages are driven by the same drive mechanism and both turrets are rotated by the same rotating mechanism, the final angular position of each turret is established by hydraulically operated shot pins 51 which exactly locate it on the transverse axis.

Turning now to the drive mechanism, it will be seen that the upper carriage 40 and the lower carriage 30 are driven along the transverse axis by rotating ball screws 60 that engage ball nuts 61 which are secured to the respective carriages as shown in FIGURE 10. The opposite ends of the ball screws 60 extend through the housing section 3 shown in FIGURE 12, where they enter into miter gear boxes of identical structure. If desirable, it may be constructed such that the ball screws move the carriages through double, preloaded ball nuts to eliminate backlash, and supported by preloaded tapered roller bearings to eliminate end play in the screw assembly. Two sectionalized views of one of these gear boxes are shown generally at 62 in FIGURES 12 and 13. Conventional miter gears are used to turn the drive direction 90° toward each other so that they can be coupled at gear 63 by means of conventional keys. This insures that both shafts are turning at the same rate of speed and at the same time. Gear 63 is then driven by a pinion 64 which is on a shaft extended in both directions. On one end, a hydraulic motor 65 drives a shaft through coupling 66 that is specially designed to have zero backlash. Servo valves 67 deliver a proportional volume of fluid to hydraulic motor 65, thereby controlling the speed and position of ball screws 60 and, therefore, the carriages. The ultimate position is established by a feed back mechanism 68, similar to that which is described hereinafter in conjunction with the workpiece clamp carriage, which works in conjunction with the numerical control and feeds back its position and velocity.

Turning now to FIGURES 9 and 10, it will be seen that the rotation of both the upper and lower turrets is accomplished by a spline drive to each turret. The spline 70, when rotating, drives a bevel gear box 71. The output shaft from gear box 71 has a pinion which meshes with ring gear 72 that is fixed to the upper turret 41 or alternatively ring gear 73 on lower turret 33. The other end of the spline shafts go to gear boxes and drives with feed back mechanism identical to the mechanism shown in FIGURES 12 and 13 for the ball screw. In this manner, both turrets rotate at the same rate of speed and in the same direction and, therefore, remain with their corresponding punches and dies in relatively good alignment. As mentioned earlier, final alignment is established by shot pins 51 which positively locate each turret exactly in the right relationship to the transverse axis. The shot pins may be of hardened steel and will operate into hardened steel precision bushings located around the perimeter of the turrets. The drive of the punching machine is interlocked with the shot pins so that the press will not stroke until the shot pins are "set." Since the shot pin establishes exact accuracy, the drive is purposely adjusted to a finite backlash that is of a predetermined magnitude consistent with the taper on the shot pin, but large enough to prevent any tendency of the shot pin to backdrive the gear train.

Figure 17:
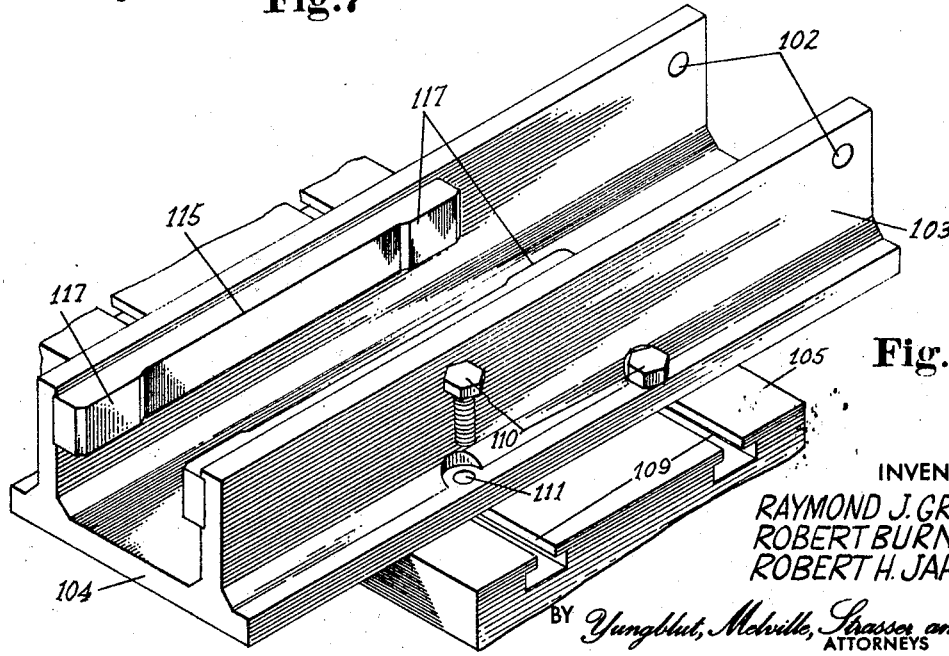
FIGURE 17 is a perspective view of the clamp holder.
Figure 14:
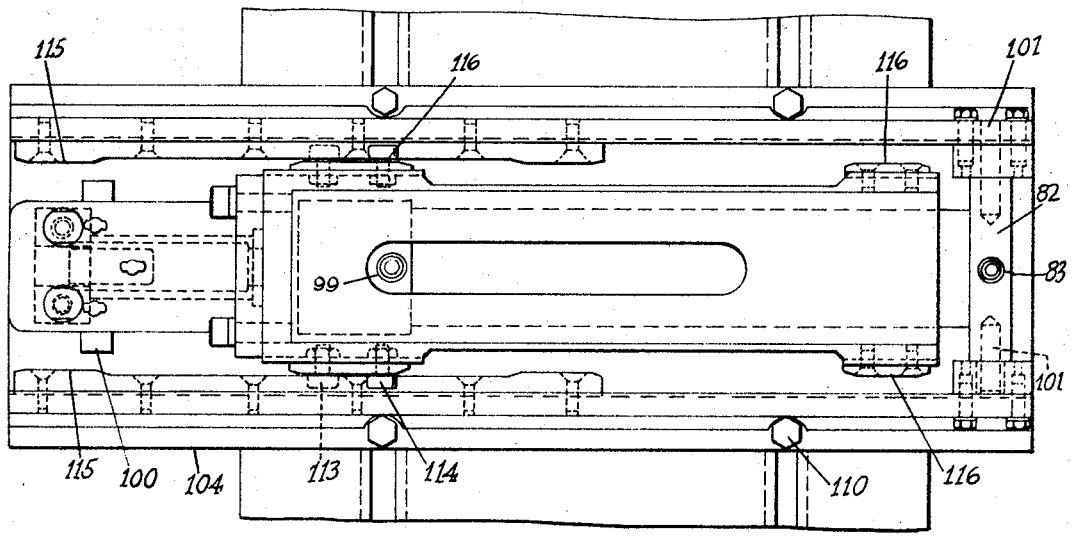
FIGURE 14 is a top fragmentary view of the workpiece clamp in a retracted position.
Figure 15:
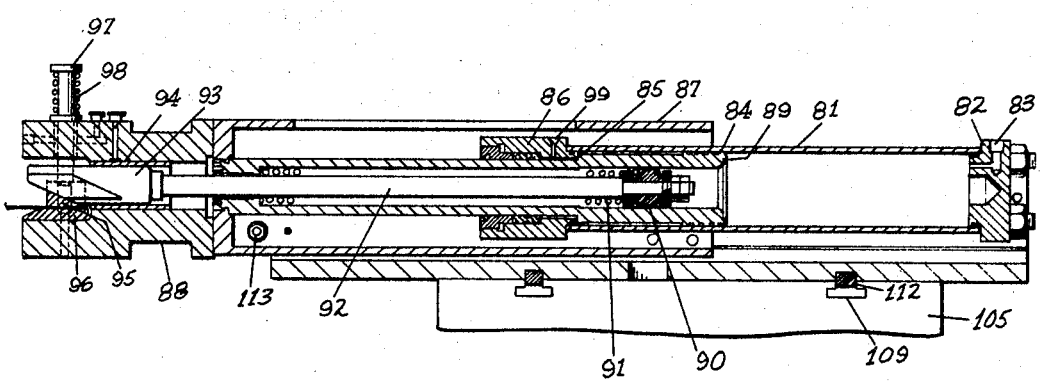
FIGURE 15 is a side cross-sectional view of the clamp shown in FIGURE 14 but in the extended and clamped position.
Figure 16:
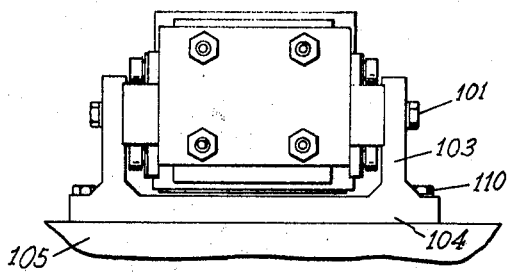
FIGURE 16 is a rear view of the clamp secured to the longitudinal moving carriage.

Prior art machines do not begin to approach the accuracy and the capabilities contemplated by the machine constructed in accordance with the instant description. A primary reason for the accuracy of the instant machine is the series of workpiece clamps which securely hold the workpiece during the punching operation, but are readily retractable to permit punching in the proximity of the clamps. The number of clamps, shown generally as 80 in FIGURE 3, is determined partially by the size and thickness of material to be punched. The number shown is merely exemplary and not limiting to the invention herein described. FIGURES 14–16 illustrate the details of the novel clamps; FIGURE 14 being a top view of a clamp in its retracted position, FIGURE 15 being a side section view of a clamp in its extended and clamped position, while FIGURE 16 is a rear view of a clamp. FIGURE 17 is a perspective view of a clamp base showing the means by which each clamp is rigidly attached to and adjusted on the longitudinal moving carriage. While it may not be apparent at this point, the overall concept of the workpiece clamp assembly is that a double action occurs from a single hydraulic source which is introduced at the rear of the assembly resulting in the application of a dual force. Turning now to the assembly as shown in FIGURE 15, the clamp comprises a cylinder 81 closed at one end by cap 82 and containing port 83 for the admission of hydraulic fluid. At the opposite end of cylinder 81 there is provided a telescopic piston 84 limited in lateral movement by the shoulder 85 of abutment 86 fitted in the open end of cylinder 81. An integral part of the clamp assembly is the casing 87 substantially enclosing the piston 84, and the jaw housing shown generally at 88. These move toward the workpiece upon the application of force against the head 89 of piston 84. Contained within a bore in said piston is a second piston 90 whose primary object is to transmit the clamping force to the workpiece itself. Biasing piston 90 against lateral movement is spring 91 surrounding rod 92. At the opposite end of rod 92, an enlarged head 93 lies contiguous with a bearing surface 94 on the internal portions of the jaw housing 88. This helps insure rigidity in the clamping assembly. The enlarged head 93 is beveled away from the workpiece in the manner illustrated to coact with the upper clamping jaw 95. The jaw housing, which is essentially U-shaped, is provided with a removable stationary lower jaw 96, for easy replacement, and made from a hardened material such as tool steel and coated with a resin-like material if desirable. Upper jaw 95 which may be elongated for maximum contact, is fastened to plungers 97 which are normally held up by the compression of springs 98. A beveled portion on upper clamp 95 engages with the bevel portion on the rod head 93, which may be fork shaped to avoid contact with the plungers, to counter the action of the spring thereby effecting the clamping operation. When it is necessary to retract the entire jaw housing, as for instance when possible interference occurs with the relation to the carriages and turrets, the oil that was directed to port 83 is now directed to port 99 in abutment 86 and exhausted from port 83. This then acts against the opposite side of piston head 84 to drive the clamp housing and all that is attached to it to the retracted position. Briefly then, and in review, hydraulic fluid is introduced into cylinder 81 through port 83 so as to apply a force on the piston 84 at 89 driving that piston forward to the position shown in FIGURE 15 where it reached a positive stop at shoulder 85, which is the head of cylinder 81. This shoulder prevents further movement forward and the hydraulic force is then intensified to act on the head of piston 90 and overcome the resistance of spring 91, thus pushing rod 92 forward and camming jaw 95 downwardly against the workpiece. When it is necessary to unclamp, the pressure is dropped to a value low enough to allow spring 91 to expand and move piston head 90 to the right. Sufficient positive pressure is still acting on the head of piston 84 holding the entire assembly in the position shown in FIGURE 15. This is important because it is the gauging position and a stop 100 built into the jaw housing 88 will control the zero-zero position of the workpiece in the transverse direction. A second retractable stop 100A located on the loading table near the punching machine, cooperating with stop 100, completes the positioning of the workpiece with respect to the zero-zero point. Retractable stop 100A, shown in FIGURE 3, interrupts the pass line of the workpiece until such time as the positioning is complete and the punching operation is to begin. Upon the activation of an air cylinder or similar device, stop 100A is retracted permitting the workpiece to pass.

Since it is highly unlikely that in the operation of this punching machine, perfectly flat sheet-like material will be encountered, there is provided in the clamp assembly means to allow a slight amount of vertical change in the workpiece location. While the movement may be due to waviness in the workpiece, it can also result during stripping of punches from the workpiece. Movement of the clamp is achieved without sacrificing any of the clamp capacity or clamping force. Attention is directed to FIGURES 14, 16 and 17 where it should be apparent how the foregoing is accomplished. The clamp is caused to pivot around pins 101 passing through holes 102 in the vertical projections 103 from the clamp base 104, and secured in the end cap 82. Thus, when there is a vertical force acting on the jaws, the clamp merely pivots about pins 101.

Due to the potential size variations in materials to be punched, it is desirable to be able to shift the relative positions of the plurality of clamps. This is accomplished by the unique manner in which the clamps are secured to the longitudinal moving carriage 105. This carriage, driven in a direction at right angles to the tool movement, lies adjacent to the loading table 106 and exit table 107 (see FIGURES 2 and 3) and is guided by hardened steel ways 108. It is driven by a hydraulic motor through a gear box to a precision pinion, which in turn will drive against a precision rack mounted on the frame of the support tables 106 and 107. Carriage 105 is provided with with parallel T slots 109 on its upper surface and in which T bolts 110 are received through holes 111 in clamp base 104, acting to secure the clamp assembly. Alignment is maintained by means of key 112.

To prevent any premature shifting of the clamp assembly during its operation, the cylinder 81 is guided by means of hardened guide shoes and rails in the horizontal and vertical direction. Additionally, hardened cam rollers may be employed as guides. Pivoting about pins 101 is made possible because the vertical guide shoes are free to move upwardly from the guide track 115, as best seen in FIGURE 17. This small amount of vertical motion has insignificant effect on the location of the workpiece because it is pivoted from a point relatively far away. The work clamp must be held rigid with respect to its base 104. This is done by the combination of guide shoes 116 working in conjunction with the vertical surface 117 of rail 115. Rail 115 has finished surfaces that engage the guide shoes 116. This affords rigidity for transmitting motion to the workpiece in the longitudinal direction.

While the construction and operation of this machine is quite important, a necessary feature to this and all machines, particularly metal working machines, are the provision for rapid tool changes and periodic maintenance. In most turret type punching machines, it is not possible, or at most extremely difficult, to move the upper turret away from the lower turret. The instant invention contemplates a convenient means for accomplishing the foregoing without affecting the accuracy of subsequent punching operations. As noted earlier, the respective turret mounted carriages are driven by ball screws 60 that engage ball nuts 61 secured to the carriages. In FIGURE 18 it will be seen how pin 120 locks the ball nut housing 121 to the carriage. When hydraulic cylinder 122 is activated, the pin is retracted and permits the ball nut housing 121 to "free wheel" with the ball screw. By so doing, it is relieved of actual work, that is moving the carriage; but its counterpart, the screw driving the lower carriage does drive the lower carriage away from the upper carriage, thereby carrying the lower turret away from the upper turret. This puts both turrets in a convenient position to work on them from the floor without one interferring with the other. As a further convenience to setting up the tools, it is possible to rotate the respective turrets by their own hydraulic motor power even though they are in the offset position that is to space one from the other. A further convenience is the provision of a movable loading table 106 and/or exit table 107. This can be accomplished by the simple addition of an air cylinder to move the tables on a set of guide rollers or tracks. Finally, when it is desirable to resume the punching operation and realign the upper and lower turrets, it is contemplated that a special low capacity, low speed motor be incorporated in this machine to turn the ram of the press over whereby the operator can watch carefully the action of the punch with respect to the die and establish that he has good punch die relationship. The drive to the shaft 16 can be effected through the use of a magnetic clutch.

A final maintenanc feature, though ancillary to the operation of the instant punching machine, is a scrap removal conveyor located between the two bed plates 9, as best seen in FIGURES 4 and 5. By locating the conveyor in this manner, the problem of spraying slugs over the floor and machine elements is avoided. While the scrap conveyor may take many conventional forms, a typical one is a vibratory conveyor which consists of a pan 123 actuated by multiple vibration stations such as 124 which, all working in unison, carry slugs out through an opening in the end housing 3.

Having thus described the mechanical features of this unique punching machine, let us now turn to the mechanism by which all of the foregoing elements cooperate to effect a program punching operation. It is to be understood that the latter does not form part of the instant invention, but is nevertheless set forth here to facilitate understanding of the operation of this invention. The type of system found operative on the instant machine is a three axis, point-to-point digital positioning system such as a General Electric Mark Century 103 P model manufactured by the General Electric Company. This system consists of position instrumentation and positioning control for independent, simultaneous control of all the coordinates. It is to be further understood that manual control is contemplated for production of "one of a kind" job. It may be helpful at this point to review this set up with the aid of FIGURE 19.

The command, designating the transverse and longitudinal movements plus the proper tool, is recorded on the system input media, which for example may be an eight-channel, one-inch wide perforated tape per EIA standard RS–227 with character coding per EIA standard RS–244. Upon initiation of the system, the information regarding the three motions is read and stored in the buffer storage. Simultaneous with the transmission of this information to the active command and to the machine, new positioning for the next hole is being read and stored in the buffer storage. When the machine returns to the top of its stroke following the punching operation, it is ready for the new command without any delay. This system in its simplest form operates on the principle of the difference between the new command position and the present position. That is, the position information provided by the data input will be used to set up a position command signal. The position feed-back units detect the error between the machine position and the command position. Any difference in correspondence, which represents the position error will provide a signal to the servo drive control to position the motion. When the position error is reduced below a predetermined value, positioning will have been accomplished within the repeatable accuracy limits and the drive comes to rest.

Positioning of the machine motion is accomplished by hydraulic motors which are controlled by electrically operated servo valves. As directed by the system command, the amount of hydraulic valve opening is varied to regulate the speed of the machine, thereby controlling the fluid flow to the hydraulic motors. As the desired position is reached, the flow, and thus the motion, slows down to a speed proportional to the position error and stops when the error is reduced to zero.

With the punching machine produced in accordance with the foregoing description, and operated in the suggested manner, it is contemplated that sheet or strip material as wide as 144 inches may be readily handled. For example, a machine constructed in accordance with the instant description having a motor drive of 20 H.P. at 1200 r.p.m. and a single steel plate ram with a stroke of 3 inches, will have a punching capacity of 200 tons at 70 strokes per minute. With this power, a workpiece size of ⅝ inch may be handled. It should be apparent that the foregoing is merely exemplary and that the capabilities of the punching machine can be varied considerably to fit the individual machine shop needs.

Having therefore described the complete operation and construction of this invention, it will be understood that numerous modifications may be made without departing from the spirit of this invention, and therefore no limitation not specifically set forth in the claims is intended.

The embodiments of the invention in which an exclusive property or privilege is claimed are defined as follows:

1. An automatic punching machine for punching material such as sheet, strip, plate and the like, from a preselected command, comprising two vertical frame members, transverse head member and transverse base member extending therebetween to define an opening, means for moving the material to be punched through said openings, a first tool holder mounted on said transverse head member for travel between said vertical frame members perpendicular to the movement of said material, a second tool holder mounted on said transverse base member for travel between said vertical frame members perpendicular to the movement of said material, drive means for moving said tool holders, opposing rotatable turrets on each of said tool holders, punch and die means received in the top and bottom turrets respectively, means for rotating said turrets, means for the simultaneous activation of said material moving means, said tool holder drive means, and said turret rotating means to a preselected operating position, and means to activate one of said punches at said position.

2. The punching machine claimed in claim 1 wherein the top turret contains a plurality of spaced apart punching stations, whereby rotation of said turret is substantially minimized.

3. The punching machine claimed in claim 2 wherein there are two punching stations spaced 180° apart.

4. The punching machine claimed in claim 3 wherein said upper turret contains a plurality of spaced apart punches, each less than 180° from another about the axis of rotation.

5. The punching machine claimed in claim 4 wherein hydraulic means are provided to maintain the inoperative position of said punches.

6. The punching machine claimed in claim 5 including a noncontinuous annular ring on the under side of said upper turret to maintain the nonpunching position of said punches.

7. The punching machine claimed in claim 5 wherein the hydraulic means is a hydraulically operated detent tapered at the punch contacting end to facilitate releasing of the preselected punch at the punching station.

8. The punching machine claimed in claim 1 including a common drive shaft for said tool holders to insure simultaneous movement and aligned positioning thereof.

9. The punching machine claimed in claim 8 including a common drive for said turrets to insure simultaneous rotation and aligned positioning thereof.

10. The punching machine claimed in claim 8 including means for disengaging the drive from one of said tool holders to effect an offsetting one from the other.

11. The punching machine claimed in claim 9 including at least one shot pin in each of said turrets, thereby providing built in backlash to assure an accurate alignment of the respective turrets.

12. The punching machine claimed in claim 10 wherein said means is a hydraulic cylinder.

13. The punching machine claimed in claim 1 wherein the means for rotating said turrets comprise a servo system including an electrically operated servo valve.

14. The punching machine claimed in claim 1, wherein the means for moving the workpiece transverse to the movement of said first and second tool holders is a plurality of retractable clamps mounted on a movable carriage, each of said clamps being independently movable from an operative gripping position on a portion of said workpiece, to an inoperative position exposing said portion to the said predetermined operating position.

15. The punching machine claimed in claim 14 including a loading table and exit table adjacent to and cooperating with said carriage to move the workpiece through the opening between said first and second tool holder.

16. The punching machine assembly claimed in claim 14 wherein means are provided for the independent movement of said tables away from said frame members.

17. The punching machine claimed in claim 1 wherein said die receiving turret is suspended in hydraulic fluid for substantially friction free rotation.

18. The punching machine in claim 1 wherein said material moving means includes at least one retractable clamp comprising a hydraulic chamber closed at one end, a first piston having a bore and received in said chamber, a second piston received in said bore and adapted to exert pressure in its operative position against a gripping means, and means for the admission of fluid into said chamber to act against said pistons and render said clamp operative.

References Cited
UNITED STATES PATENTS

| | | | |
|---|---|---|---|
| 802,181 | 10/1905 | Beyer | 83—277 |
| 1,283,829 | 11/1918 | Loesser. | |
| 1,807,652 | 6/1931 | Dietrich | 83—552 |
| 2,363,208 | 11/1944 | Sulzer | 83—213 X |
| 2,958,247 | 11/1960 | Levine | 83—71 |
| 3,165,952 | 1/1965 | Thompson et al. | 83—71 |
| 3,264,915 | 8/1966 | Peterson et al. | 83—71 |
| 3,347,121 | 10/1967 | Wiatt | 83—71 |

JAMES M. MEISTER, *Primary Examiner.*

U.S. Cl. X.R.

83—214, 277, 552, 560, 618